(12) United States Patent
Wada et al.

(10) Patent No.: US 9,701,562 B2
(45) Date of Patent: *Jul. 11, 2017

(54) MOBILE-DISPLAY COVER GLASS AND METHOD FOR MANUFACTURING SAME

(71) Applicant: NIPPON ELECTRIC GLASS CO., LTD., Otsu-shi, Shiga (JP)

(72) Inventors: Masanori Wada, Otsu (JP); Osamu Odani, Otsu (JP); Masayuki Ikemoto, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/423,233

(22) PCT Filed: Sep. 25, 2013

(86) PCT No.: PCT/JP2013/075893
§ 371 (c)(1),
(2) Date: Feb. 23, 2015

(87) PCT Pub. No.: WO2014/057805
PCT Pub. Date: Apr. 17, 2014

(65) Prior Publication Data
US 2015/0251943 A1    Sep. 10, 2015

(30) Foreign Application Priority Data

Oct. 10, 2012 (JP) .................. 2012-224825
Jul. 31, 2013 (JP) .................. 2013-158498

(51) Int. Cl.
C03B 23/03    (2006.01)
H04B 1/3888   (2015.01)
C03B 23/025   (2006.01)

(52) U.S. Cl.
CPC ...... *C03B 23/0307* (2013.01); *C03B 23/0256* (2013.01); *C03B 23/0258* (2013.01);
(Continued)

(58) Field of Classification Search
None
See application file for complete search history.

(56) References Cited

U.S. PATENT DOCUMENTS 4,678,495 A    7/1987  Yoshizawa
8,119,048 B2 * 2/2012  Nishimura ........ B29C 45/14073
                                                264/252
(Continued)

FOREIGN PATENT DOCUMENTS

CN    101518168 A    8/2009
CN    1026639634 A   9/2012
(Continued)

OTHER PUBLICATIONS

Official Communication issued in International Patent Application No. PCT/JP2013/075893, mailed on Dec. 24, 2013.
(Continued)

*Primary Examiner* — Queenie Dehghan
(74) *Attorney, Agent, or Firm* — Keating and Bennett, LLP

(57) ABSTRACT

Provided is a mobile-display cover glass less susceptible to damage from impact caused upon dropping of a mobile display. A mobile-display cover glass (1) is a mobile-display cover glass configured to cover a display region (2a) and at least a portion of a side surface (2b) of a mobile display (2). The mobile-display cover glass (1) includes a flat sheet-like front portion (11) and a side portion (12, 13). The front portion (11) is configured to be disposed in front of the display region (2a). The front portion (11) extends in a first direction and a second direction perpendicular to the first direction. The side portion (12, 13) is configured to be disposed lateral to the mobile display (2). The side portion
(Continued)

(12, 13) includes a bent portion (12a, 13a). The bent portion (12a, 13a) bends backward from one end of the front portion (11) in the first direction. A corner (12c, 13c) of the side portion (12, 13) has a rounded shape.

7 Claims, 5 Drawing Sheets

(52) U.S. Cl.
CPC ....... *C03B 23/0305* (2013.01); *H04B 1/3888* (2013.01); *C03B 23/0252* (2013.01); *C03B 23/0302* (2013.01); *Y10T 428/24264* (2015.01)

(56) References Cited

U.S. PATENT DOCUMENTS

| | | | |
|---|---|---|---|
| 9,187,364 B2* | 11/2015 | Joos | C03C 17/002 |
| 2010/0014232 A1 | 1/2010 | Nishimura | |
| 2010/0050694 A1* | 3/2010 | Dajoux | C03B 23/03 65/106 |
| 2010/0206008 A1 | 8/2010 | Harvey et al. | |
| 2010/0229602 A1 | 9/2010 | Ross et al. | |
| 2011/0003619 A1 | 1/2011 | Fujii | |
| 2011/0049764 A1 | 3/2011 | Lee et al. | |
| 2012/0055826 A1 | 3/2012 | Nishimura | |
| 2012/0114901 A1* | 5/2012 | Uraji | B32B 1/00 428/121 |
| 2013/0329346 A1* | 12/2013 | Dannoux | C03B 23/0235 361/679.01 |
| 2014/0116094 A1 | 5/2014 | Ross et al. | |
| 2014/0202985 A1 | 7/2014 | Fujii | |

FOREIGN PATENT DOCUMENTS

| | | |
|---|---|---|
| JP | 55-104931 A | 8/1980 |
| JP | 60-021825 A | 2/1985 |
| JP | 63-21229 A | 1/1988 |
| JP | 07-142014 A | 6/1995 |
| JP | 2001-42303 A | 2/2001 |
| JP | 2002-220243 A | 8/2002 |
| JP | 2003-502257 A | 1/2003 |
| JP | 2004-101741 A | 4/2004 |
| JP | 2009-167086 A | 7/2009 |
| JP | 2012-101975 A | 5/2012 |
| JP | 2012-116722 A | 6/2012 |
| JP | 1454618 S | 11/2012 |
| JP | 2013-228669 A | 11/2013 |
| TW | 201226342 A1 | 7/2012 |
| WO | 00/76924 A1 | 12/2000 |
| WO | 2010/104698 A1 | 9/2010 |
| WO | 2012/030751 A2 | 3/2012 |

OTHER PUBLICATIONS

Official Communication issued in corresponding European Patent Application No. 13846184.3, mailed on May 23, 2016.
Official Communication issued in corresponding Chinese Patent Application No. 201380053122.0, mailed on Aug. 1, 2016.
Official Communication issued in corresponding Taiwanese Patent Application No. 102128369, mailed on Oct. 7, 2016.
Official Communication issued in corresponding Japanese Patent Application No. 2014-013199, mailed on Oct. 25, 2016.

* cited by examiner

MOBILE-DISPLAY COVER GLASS AND METHOD FOR MANUFACTURING SAME

TECHNICAL FIELD

This invention relates to mobile-display cover glasses and methods for manufacturing the same.

BACKGROUND ART

Mobile devices with a display, including cellular phones, smartphones, notebook personal computers, and tablet personal computers, have recently been widely used (hereinafter, a mobile device with a display is referred to as a "mobile display").

Patent Literature 1 describes a cover glass that can be used for a mobile display. The cover glass described in Patent Literature 1 includes: a front portion located in front of an image display region; and bent portions located at both sides of the image display region in a width direction thereof and bending away from the front portion.

CITATION LIST

Patent Literature

[PTL 1]
JP-A-2012-101975

SUMMARY OF INVENTION

Technical Problem

Such a cover glass for a mobile display is required to be less susceptible to damage from impact caused upon dropping of the mobile display.

A principal object of the present invention is to provide a mobile-display cover glass less susceptible to damage from impact caused upon dropping of a mobile display.

Solution to Problem

The mobile-display cover glass according to the present invention is a mobile-display cover glass configured to cover a display region and at least a portion of a side surface of a mobile display. The mobile-display cover glass according to the present invention includes a flat sheet-like front portion and a side portion. The front portion is configured to be disposed in front of the display region. The front portion extends in a first direction and a second direction perpendicular to the first direction. The side portion is configured to be disposed lateral to the mobile display. The side portion includes a bent portion. The bent portion bends backward from one end of the front portion in the first direction. A corner of the side portion has a rounded shape.

When the corner having a rounded shape has an arcuate contour, the relation $L_1 > L_2$ is preferably satisfied where $L_1$ represents a length of the side portion at a part thereof other than the corner, the length running from a starting point of the bending of the bent portion to an end of the side portion and measured along an outside surface of the side portion, and $L_2$ represents a length of the corner having a rounded shape, the length being measured on the outside surface of the side portion along the second direction.

It is more preferred that the relation $L_1 \geq (3/2) \cdot L_2$ be satisfied.

The contour of the corner having a rounded shape may have an arcuate shape having a radius of curvature of 0.1 mm to 5.0 mm.

The mobile-display cover glass according to the present invention preferably has a thickness within a range of 0.2 mm to 1.5 mm.

The relation $L_3 > L_2$ may be satisfied where $L_2$ represents a length of the corner having a rounded shape, measured on the outside surface of the side portion along the second direction, and $L_3$ represents a length of the corner having a rounded shape, measured on the outside surface of the side portion along the first direction.

The corner having a rounded shape may have an elliptically arcuate contour having a major axis parallel to the first direction in development view.

A method for manufacturing a mobile-display cover glass according to the present invention relates to a method for manufacturing the mobile-display cover glass according to the present invention. In the method for manufacturing the mobile-display cover glass according to the present invention, a rectangular flat glass sheet having a corner of a rounded shape is prepared. The flat glass sheet is placed on a forming die having a flat forming surface so that a middle portion of the flat glass sheet in one direction is located on the forming surface and an end portion of the flat glass sheet in the one direction is located outside the forming surface. The end portion of the flat glass sheet is pressed down with the application of heat to form the front portion and the side portion.

Advantageous Effects of Invention

The present invention can provide a mobile-display cover glass less susceptible to damage from impact caused upon dropping of a mobile display.

DESCRIPTION OF EMBODIMENTS

Figure 1:
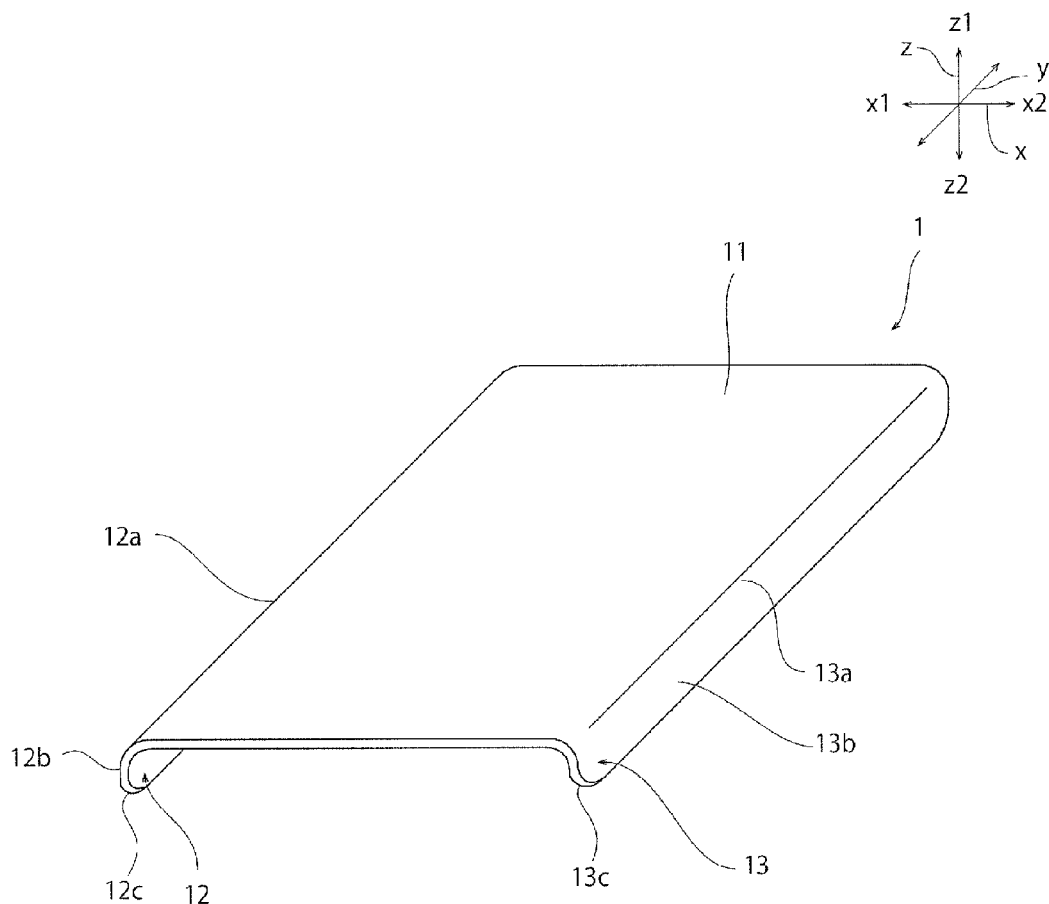
FIG. 1 is a schematic perspective view of a mobile-display cover glass according to one embodiment of the present invention.

Hereinafter, a description will be given of an exemplary preferred embodiment for working of the present invention. However, the following embodiment is simply illustrative. The present invention is not at all limited to the following embodiment.

Throughout the drawings to which the embodiment and the like refer, elements having substantially the same functions will be referred to by the same reference signs. The drawings to which the embodiment and the like refer are schematically illustrated. The dimensional ratios and the like of objects illustrated in the drawings may be different from those of the actual objects. Different drawings may have different dimensional ratios and the like of the objects. Dimensional ratios and the like of specific objects should be determined in consideration of the following descriptions.

(Mobile-Display Cover Glass 1)

Figure 2:
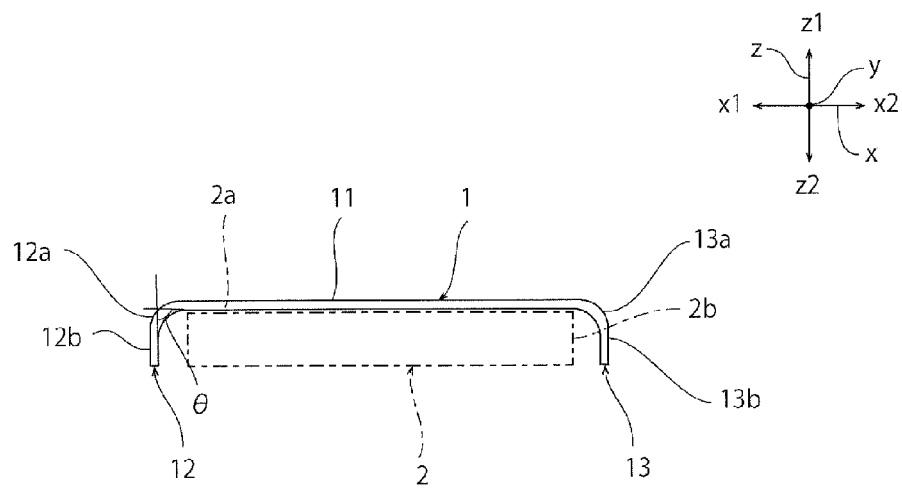
FIG. 2 is a schematic front view of the mobile-display cover glass according to the one embodiment of the present invention.
Figure 3:
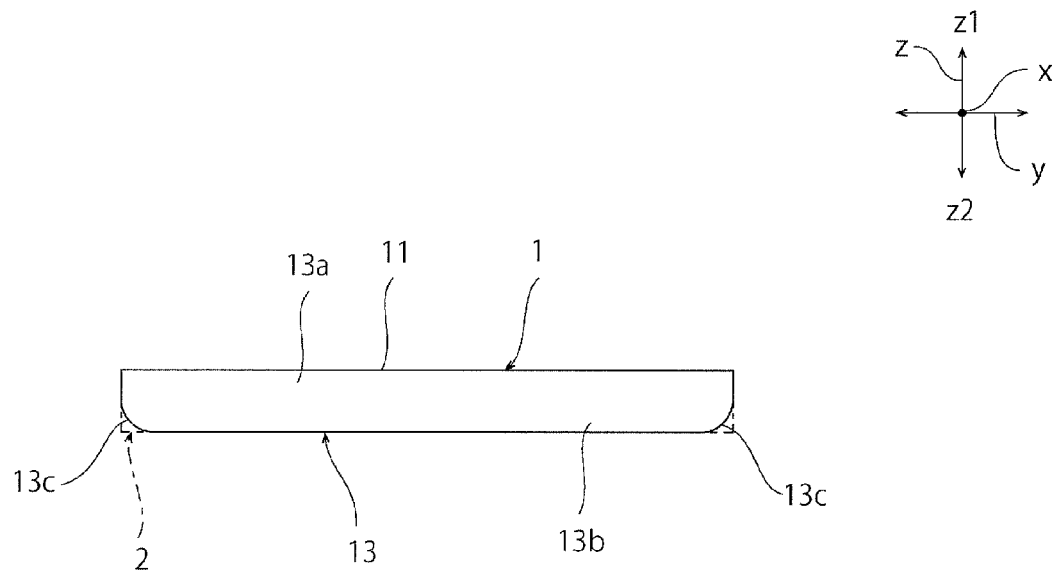
FIG. 3 is a schematic side view of the mobile-display cover glass according to the one embodiment of the present invention.
Figure 4:
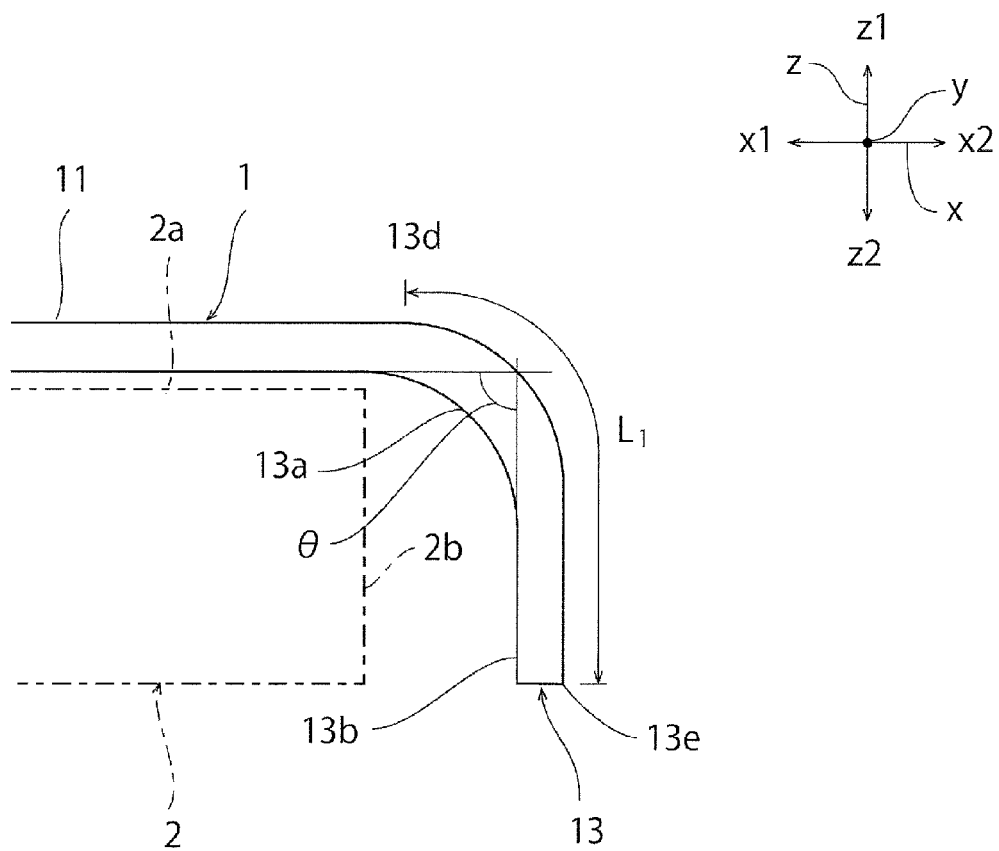
FIG. 4 is an enlarged schematic front view of a portion of the mobile-display cover glass according to the one embodiment of the present invention.
Figure 5:
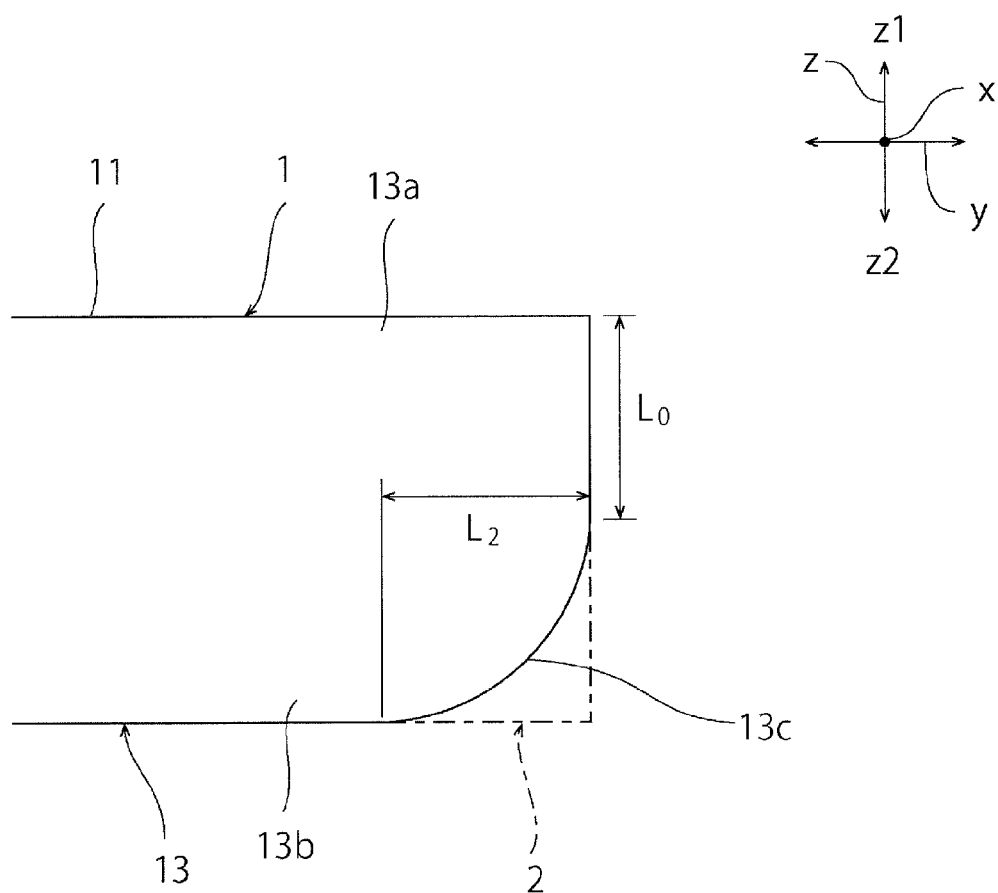
FIG. 5 is an enlarged schematic side view of a portion of the mobile-display cover glass according to the one embodiment of the present invention.

FIG. 1 is a schematic perspective view of a mobile-display cover glass according to this embodiment. FIG. 2 is a schematic front view of the mobile-display cover glass according to this embodiment. FIG. 3 is a schematic side view of the mobile-display cover glass according to this embodiment. FIG. 4 is an enlarged schematic front view of a portion of the mobile-display cover glass according to this embodiment. FIG. 5 is an enlarged schematic side view of a portion of the mobile-display cover glass according to this embodiment.

The mobile-display cover glass 1 shown in FIGS. 1 to 5 is, as shown in FIG. 2, a cover glass configured to cover a display region 2a and at least portions of side surfaces 2b of a mobile display 2 (see FIGS. 2 and 3). More specifically, the mobile-display cover glass 1 is a cover glass configured to cover the display region 2a of the mobile display 2 and at least portions of both side surfaces thereof in the x-axis direction. No particular limitation is placed on the type of the mobile display 2 so long as it is a mobile device equipped with a display. The mobile display 2 may be, for example, a cellular phone, a smartphone, a notebook personal computer, a tablet personal computer or the like. The mobile display 2 may be in a plate-like shape.

The mobile-display cover glass 1 is preferably made of, for example, a tempered glass such as a chemically tempered glass, a crystallized glass or the like.

The thickness of the mobile-display cover glass 1 is not necessarily limited but is preferably 0.2 mm to 1.5 mm, more preferably 0.25 mm to 1.1 mm, and still more preferably 0.3 mm to 1.0 mm.

The mobile-display cover glass 1 includes a front portion 11. The front portion 11 is a portion to be disposed in front (on a z1 side) of the display region 2a of the mobile display 2. The term "in front of" herein refers to a direction of extension of the normal of the display region 2a and the opposite side to the direction of extension of the normal is referred to as backward.

The front portion 11 has a flat sheet-like shape. The front portion 11 extends in the x-axis direction and the y-axis direction perpendicular to the x-axis direction. The front portion 11 has a rectangular shape. The dimension of the front portion 11 along the x-axis direction may be, for example, about 40 mm to about 200 mm. The dimension of the front portion 11 along the y-axis direction may be, for example, about 80 mm to about 300 mm. The term "flat sheet-like shape" includes a substantially flat sheet-like shape. For example, the term "flat sheet" includes a sheet having one surface and the other surface inclined at 5° or less with respect to the one surface.

An x1-side end of the front portion 11 in the x-axis direction is connected to a first side portion 12. This first side portion 12 is a portion to be disposed lateral to the mobile display 2. Specifically, the first side portion 12 is disposed on an x1 side of the mobile display 2 in the x-axis direction.

The first side portion 12 includes a first bent portion 12a. The first bent portion 12a bends backward (toward a z2 side) from the x1-side end of the front portion 11 in the x-axis direction. A bending angle θ (see FIG. 2), the angle formed by the tangent line of the inside wall surface of the x1-side end of the front portion 11 and the tangent line of the inside wall surface of the distal end of the first side portion 12, is preferably 90° to 170°, more preferably 90° to 160°, and still more preferably 90° to 150°.

Particularly in this embodiment, the first side portion 12 includes the first bent portion 12a and a first flat portion 12b connected to an end of the first bent portion 12a. However, the present invention is not limited to this configuration. The first side portion 12 may be composed of the first bent portion 12a alone.

An x2-side end of the front portion 11 in the x-axis direction is connected to a second side portion 13. This second side portion 13, the front portion 11, and the first side portion 12 are formed of a single glass sheet. The second side portion 13 is a portion to be disposed lateral to the mobile display 2. Specifically, the second side portion 13 is disposed on an x2 side of the mobile display 2 in the x-axis direction.

The second side portion 13 includes a second bent portion 13a. The second bent portion 13a bends backward (toward the z2 side) from the x2-side end of the front portion 11 in the x-axis direction. The bending angle (θ) between the front portion 11 and the second side portion 13 is preferably 90° to 170°, more preferably 90° to 160°, and still more preferably 90° to 150°.

Particularly in this embodiment, the second side portion 13 includes the second bent portion 13a and a second flat portion 13b connected to an end of the second bent portion 13a. However, the present invention is not limited to this configuration. The second side portion 13 may be composed of the second bent portion 13a alone.

Generally, as also described in Patent Literature 1, the corners of the side portions are provided to have a right angle. In other words, the corners of the side portions do not have a rounded shape. The reason for this is that if the corners of the side portions are attempted to be formed in a rounded shape, a flat glass sheet must be deformed by softening, which makes it difficult to produce a cover glass. On the other hand, if the corners of the side portions are provided to have a right angle, the mobile-display cover glass is susceptible to damage when a mobile display with the mobile-display cover glass attached thereto drops and thus any corner of the mobile display hits the ground.

In contrast, in the mobile-display cover glass 1, the corners 12c, 13c of the side portions 12, 13 have a rounded shape. In other words, the corners 12c, 13c of the side portions 12, 13 are provided in a round chamfered shape. Therefore, even if the mobile display 2 with the mobile-display cover glass 1 attached thereto drops and any corner of the mobile display 2 hits the ground, impact upon hitting the ground is less likely to propagate to the corner 12c, 13c of the side portion 12, 13 and therefore the mobile-display cover glass 1 is less susceptible to damage.

From the viewpoint of more effectively reducing the damage of the mobile-display cover glass 1 upon dropping, the contour of the corners 12c, 13c of the side portions 12, 13 preferably has an arcuate shape and more preferably has an arcuate shape with a radius of curvature of not less than 0.1 mm and an arcuate shape with a radius of curvature of not more than 5.0 mm.

(Method for Manufacturing Mobile-Display Cover Glass 1)

No particular limitation is placed on the method for manufacturing the mobile-display cover glass 1. The mobile-display cover glass 1 can be manufactured by, for example, the following manufacturing method.

Figure 6:
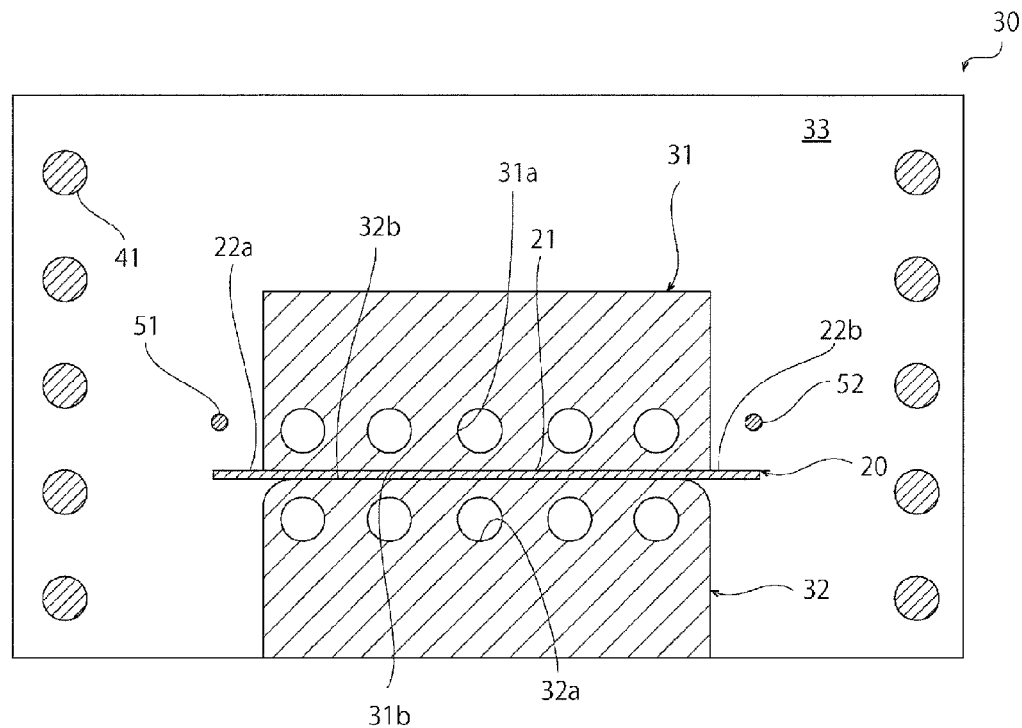
FIG. 6 is a schematic cross-sectional view for illustrating a manufacturing step for the mobile-display cover glass in the one embodiment of the present invention.

First, a flat glass sheet 20 shown in FIG. 6 is prepared. The flat glass sheet 20 is a glass sheet for use to constitute a mobile-display cover glass 1. Each of four corners of the flat glass sheet 20 is for use to constitute one corner of the side portions 12, 13. Therefore, each of the four corners of the flat glass sheet 20 has a rounded shape. The thickness of the flat glass sheet 20 is substantially equal to that of the mobile-display cover glass 1. This flat glass sheet 20 is formed into a mobile-display cover glass 1 using a forming apparatus 30.

The forming apparatus 30 includes a forming chamber 33. The forming chamber 33 is internally provided with a heater 41. The heater 41 radiates heat rays. Therefore, the forming apparatus 30 can radiationally heat an object placed in the forming chamber 33.

First and second heat-insulating members 31, 32 having their respective flat forming surfaces 31b, 32b are disposed in the forming chamber 33. The first and second heat-insulating members 31, 32 are members that have a function as a forming die and are configured to reduce the transfer of radiation heat to the flat glass sheet 20. The first and second heat-insulating members 31, 32 preferably have a lower thermal conductivity than the flat glass sheet 20. Furthermore, the first and second heat-insulating members 31, 32 preferably block heat rays emitted from the heater 41. The first and second heat-insulating members 31, 32 can be formed of, for example, ceramic material containing as a major ingredient alumina, silicon carbide or diatomite.

Each of the heat-insulating members 31, 32 includes at least one through hole 31a, 32a. A coolant, such as air, is fed through these through holes 31a, 32a during heating and forming. Thus, the temperature of the heat-insulating members 31, 32 can be controlled. For example, an undesirable temperature rise of the heat-insulating members 31, 32 can be prevented.

In forming the flat glass sheet 20, first, the flat glass sheet 20 is placed so that a first portion 21 of the flat glass sheet 20, which is a middle portion thereof in one direction, is located on the forming surface 32b of the second heat-insulating member 32 and second portions 22a, 22b of the flat glass sheet 20, which are end portions thereof in the one direction, are located outside the forming surface 32b. Thereafter, the first heat-insulating member 31 is put on the first portion 21 of the flat glass sheet 20. Thus, the first portion 21 is held between the first and second heat-insulating members 31, 32. The second portions 22a, 22b are not held between the first and second heat-insulating members 31, 32.

Next, with the first portion 21 of the flat glass sheet 20 held between the first and second heat-insulating members 31, 32, the heater 41 is actuated to radiationally heat the flat glass sheet 20 (heating step).

Figure 7:
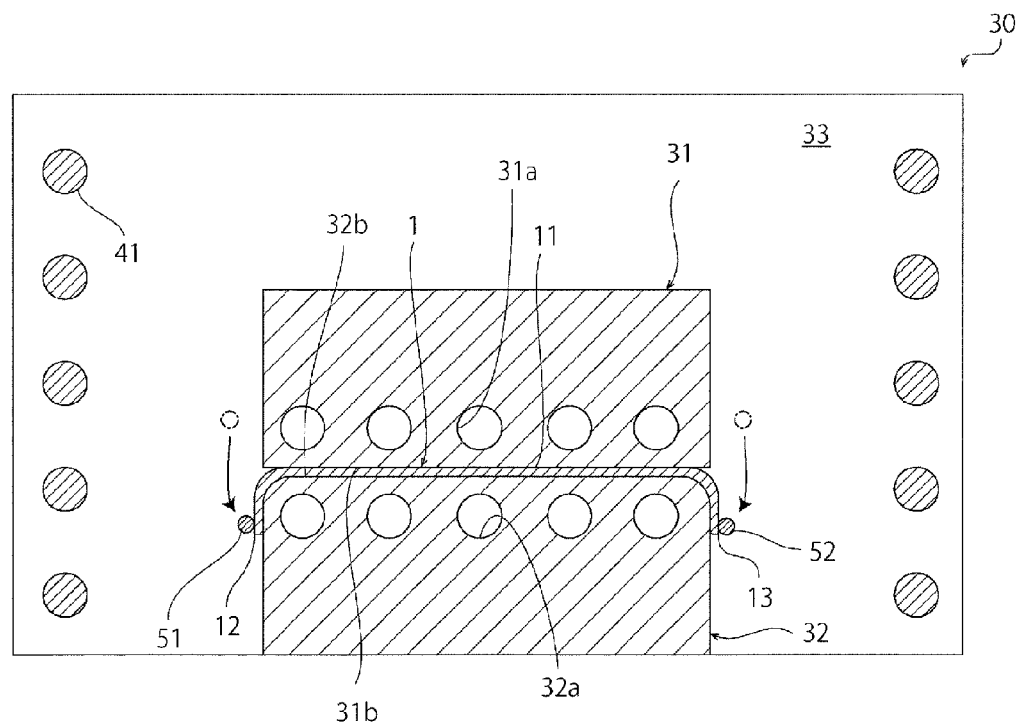
FIG. 7 is a schematic cross-sectional view for illustrating another manufacturing step for the mobile-display cover glass in the one embodiment of the present invention.

And then, as shown in FIG. 7, the second portions 22a, 22b are bent by pressing them downward using pressing tools 51, 52 provided on both sides of the first and second heat-insulating members 31, 32 (forming step). Thus, a front portion 11 is formed from the first portion 21 and side portions 12, 13 are formed from the second portions 22a, 22b, thereby obtaining a mobile-display cover glass 1.

The forming may be performed using the second heat-insulating member 32 and the pressing tools 51, 52 without provision of the first heat-insulating member 31.

If the side portions 12, 13 are formed by pressing the ends of the second portions 22a, 22b using the pressing tools 51, 52 as described above, since the corners of the second portions 22a, 22b have a rounded shape, the corners are not directly pressed by the pressing tools 51, 52. Furthermore, the length of each second portion 22a, 22b along the x-axis direction is shorter at both ends thereof in the y-axis direction than at the other portion thereof. Therefore, the ends of each bent portion 12a, 13a in the y-axis direction are likely to have a greater radius of curvature than the other portion thereof. This makes it difficult to obtain a mobile-display cover glass 1 having a high shape accuracy.

In view of the above, when the contour of the corners of the second portions 22a, 22b has an arcuate shape, the relation $L_1 > L_2$ is preferably satisfied where $L_1$ represents the length (mm) of each side portion 12, 13 at the part thereof other than the corners 12c, 13c, the length running from a starting point of the bending to an end surface 13e and measured along the outside surface of the side portion 12, 13 (see FIG. 4), and $L_2$ represents the length (mm) of the corner 12c, 13c having a rounded shape, measured on the outside surface of the side portion 12, 13 along the y-axis direction (see FIG. 5).

If $L_1 \leq L_2$, it is difficult to form both ends of the side portions 12, 13 in the y-axis direction, at which the corners 12c, 13c having a rounded shape are located, in the same manner as the formation of the middle portions of the side portions 12, 13 in the y-axis direction. By satisfying $L_1 > L_2$, both ends of the side portions 12, 13 in the y-axis direction can have a length ($L_0$) on the outside surface thereof along the z-axis direction, so that the mobile-display cover glass 1 can be manufactured with a high shape accuracy.

When the contour of the corners of the second portions 22a, 22b has an arcuate shape, $L_2$ is equal to the radius of curvature of the contour of the corners of the second portions 22a, 22b.

From the viewpoint of achieving a higher shape accuracy, the relation $L_1 \geq (3/2) \cdot L_2$ is preferably satisfied and the relation $L_1 \geq (2/1) \cdot L_2$ is more preferably satisfied. When the contour of the corners 12c, 13c of a rounded shape of the side portions 12, 13 has an arcuate shape, the radius of curvature of the corners 12c, 13c is preferably less than $L_1$, more preferably not more than 2/3 times as much as $L_1$, and still more preferably not more than 1/2 times as much as $L_1$. Furthermore, the radius of curvature of the corners 12c, 13c is preferably not more than the height of the side portion 12, 13 in side view (when viewed from the x-axis direction), more preferably not more than 2/3 times the height of the side portion 12, 13 in side view, and still more preferably not more than 1/2 times the height of the side portion 12, 13 in side view. Specifically, the radius of curvature of the corners 12c, 13c of the side portions 12, 13 is preferably not more than 5 mm and more preferably not more than 3 mm. However, if the radius of curvature of the corners 12c, 13c of the side portions 12, 13 is too small, the resistance to impact upon dropping may be low. Therefore, the radius of curvature of the corners 12c, 13c of the side portions 12, 13 is preferably not less than 0.1 mm, more preferably not less than 0.2 mm, still more preferably not less than 0.3 mm, and yet still more preferably not less than 0.5 mm.

As $L_1$ is smaller, the problem is more likely to arise that a mobile-display cover glass 1 having a higher shape accuracy is difficult to obtain. Therefore, when $L_1$ is not more than 5.0 mm and particularly not more than 3.0 mm, it is more effective to provide the corners 12c, 13c of the side portions 12, 13 to satisfy the relation $L_1>L_2$. Although no particular limitation is placed on the lower limit of $L_1$, it is generally about 2.0 mm.

Also, as the bending angle θ is smaller, the problem is more likely to arise that a mobile-display cover glass 1 having a higher shape accuracy is difficult to obtain. Therefore, when the bending angle θ is not more than 120° and particularly not more than 100°, it is more effective to provide the corners 12c, 13c of the side portions 12, 13 to satisfy the relation $L_1>L_2$. Although no particular limitation is placed on the lower limit of the bending angle θ, it is generally about 90°.

Figure 8:
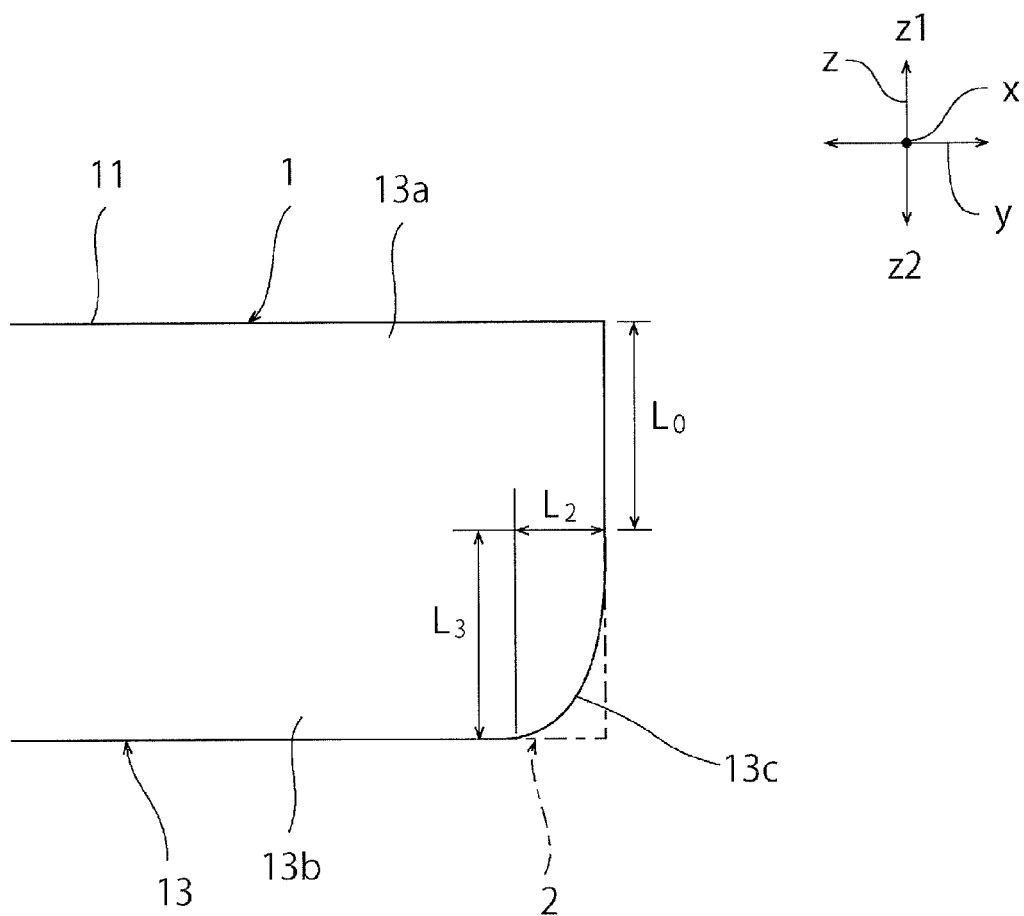
FIG. 8 is an enlarged schematic side view of a portion of a mobile-display cover glass according to a modification.

In this embodiment, an example has been described in which the contour of the corners 12c, 13c of the side portions 12, 13 has an arcuate shape. In the present invention, however, no particular limitation is placed on the contour of the corners of the side portions so long as it has a rounded shape. For example, as shown in FIG. 8, the side portions 12, 13 may have a shape that satisfies the relation $L_3>L_2$ where $L_3$ represents the length (mm) of the corner 12c, 13c having a rounded shape, measured on the outside surface of the side portion 12, 13 along the x-axis direction. For example, the contour of the corners 12c, 13c of a rounded shape of the side portions 12, 13 may have an elliptically arcuate shape having a major axis parallel to the x-axis direction in development view. In this case, in press working using the pressing tools 51, 52, portions of the flat portions 12b, 13b closer to the ends thereof in the y-axis direction can be pressed by the pressing tools 51, 52. Therefore, a mobile-display cover glass 1 having a higher shape accuracy can be obtained. From the viewpoint of achieving a still higher shape accuracy, the relation $L_3 \geq (3/2) \cdot L_2$ is preferably satisfied and the relation $L_3 \geq (2/1) \cdot L_2$ is more preferably satisfied.

REFERENCE SIGNS LIST

1 . . . mobile-display cover glass
2 . . . mobile display
2a . . . display region
2b . . . side surface
11 . . . front portion
12 . . . first side portion
12a . . . first bent portion
12b . . . first flat portion
12c . . . corner
13 . . . second side portion
13a . . . second bent portion
13b . . . second flat portion
13c . . . corner
13d . . . starting point of bending
13e . . . end surface
20 . . . flat glass sheet
21 . . . first portion
22a, 22b . . . second portion
30 . . . forming apparatus
31, 32 . . . heat-insulating member
31a, 32a . . . through hole
31b, 32b . . . forming surface
33 . . . forming chamber
41 . . . heater
51, 52 . . . pressing tool

The invention claimed is:

1. A method for manufacturing a mobile-display cover glass comprising the steps of:
   preparing a rectangular flat glass sheet having a corner of a rounded shape;
   placing the flat glass sheet on a forming die having a flat forming surface so that a middle portion of the flat glass sheet in a first direction is located on the forming surface and an end portion of the flat glass sheet in the first direction is located outside the forming surface;
   placing a heat-insulating member on the middle portion of the flat glass sheet to hold the middle portion between the forming die and the heat-insulating member; and
   pressing down the end portion of the flat glass sheet with the application of heat while holding the middle portion between the forming die and the heat-insulating member to form a front portion and a side portion; wherein
   each of the forming die and the heat-insulating member includes at least one through hole, and the method further comprises the step of:
   feeding a coolant through the through hole of the forming die and the through hole of the heat-insulating member during the application of heat and the forming of the front portion and the side portion in order to control a temperature of the forming die and the heat-insulating member.

2. The method for manufacturing the mobile-display cover glass according to claim 1, wherein
   the corner having a rounded shape has an arcuate contour, and
   the relation $L_1>L_2$ is satisfied where
   $L_1$ represents a length of the side portion at a part thereof other than the corner, the length running from a starting point of bending of a bent portion to an end of the side portion and measured along an outside surface of the side portion, and
   $L_2$ represents a length of the corner having a rounded shape, the length being measured on the outside surface of the side portion along a second direction that is perpendicular to the first direction.

3. The method for manufacturing the mobile-display cover glass according to claim 2, wherein the relation $L_1 \geq (3/2) \cdot L_2$ is satisfied.

4. The method for manufacturing the mobile-display cover glass according to claim 2, wherein the contour of the corner having a rounded shape has an arcuate shape having a radius of curvature of 0.1 mm to 5.0 mm.

5. The method for manufacturing the mobile-display cover glass according to claim 1, wherein the mobile-display cover glass has a thickness within a range of 0.2 mm to 1.5 mm.

6. The method for manufacturing the mobile-display cover glass according to claim 1, wherein the relation $L_3>L_2$ is satisfied where
   $L_2$ represents a length of the corner having a rounded shape, measured on an outside surface of the side portion along a second direction that is perpendicular to the first direction, and
   $L_3$ represents a length of the corner having a rounded shape, measured on the outside surface of the side portion along the first direction.

7. The method for manufacturing the mobile-display cover glass according to claim 6, wherein the corner having a rounded shape has an elliptically arcuate contour having a major axis parallel to the first direction in development view.

* * * * *